United States Patent
Kanemitsu et al.

(10) Patent No.: US 8,593,546 B2
(45) Date of Patent: Nov. 26, 2013

(54) IMAGE PROCESSING APPARATUS, IMAGE PROCESSING METHOD, AND CAMERA MODULE FOR DETECTING AND CORRECTING DEFECTIVE PIXELS BASED ON CONTRAST AND ILLUMINANCE

(75) Inventors: Shiroshi Kanemitsu, Kanagawa (JP);
Kazuhiro Tabuchi, Kanagawa (JP);
Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 365 days.

(21) Appl. No.: 13/171,693

(22) Filed: Jun. 29, 2011

(65) Prior Publication Data
US 2012/0050586 A1 Mar. 1, 2012

(30) Foreign Application Priority Data

Sep. 1, 2010 (JP) .................................. 2010-196112

(51) Int. Cl.
*H04N 9/64* (2006.01)

(52) U.S. Cl.
USPC ......................................... 348/246; 382/275

(58) Field of Classification Search
USPC ......... 348/207.99, 222.1, 241, 246, 247, 294; 382/149, 262, 275; 250/559.41, 250/559.45, 559.46; 358/3.26
See application file for complete search history.

(56) References Cited

U.S. PATENT DOCUMENTS

| 2007/0097237 | A1* | 5/2007 | Kono | 348/246 |
| 2008/0239121 | A1* | 10/2008 | Egawa | 348/294 |
| 2008/0266428 | A1* | 10/2008 | Egawa | 348/246 |
| 2011/0069209 | A1 | 3/2011 | Kanemitsu et al. | |

FOREIGN PATENT DOCUMENTS

| JP | 2006-238060 | | 9/2006 |
| JP | 2006-345332 | A | 12/2006 |
| JP | 2007-151095 | | 6/2007 |
| JP | 2007-267072 | A | 10/2007 |
| JP | 2008-258909 | | 10/2008 |

OTHER PUBLICATIONS

Office Action issued Dec. 18, 2012 in Japanese Patent Application No. 2010-196112 with English language translation.

* cited by examiner

*Primary Examiner* — Nelson D. Hernández Hernández
*Assistant Examiner* — Dennis Hogue
(74) *Attorney, Agent, or Firm* — Oblon, Spivak, McClelland, Maier & Neustadt, L.L.P.

(57) ABSTRACT

According to one embodiment, an image processing apparatus includes a defect correction unit, a noise reduction processing unit, and an output selection unit. The defect correction unit includes a contrast determination unit and an illuminance determination unit. The output selection unit selects the output from the defect correction unit when a target pixel is determined to be a defect. The defect correction unit enables a correction value to be output as a signal value which is applied to the target pixel in accordance with the contrast determination and the illuminance determination.

20 Claims, 9 Drawing Sheets

IMAGE PROCESSING APPARATUS, IMAGE PROCESSING METHOD, AND CAMERA MODULE FOR DETECTING AND CORRECTING DEFECTIVE PIXELS BASED ON CONTRAST AND ILLUMINANCE

CROSS-REFERENCE TO RELATED APPLICATIONS

This application is based upon and claims the benefit of priority from the prior Japanese Patent Application No. 2010-196112, filed on Sep. 1, 2010; the entire contents of all of which are incorporated herein by reference.

FIELD

Embodiments described herein relate generally to an image processing apparatus, an image processing method, and a camera module.

BACKGROUND

In the related art, an imaging apparatus having a defect correction means is known. The defect correction means corrects a lost portion (hereinafter appropriately referred to as a "defect") of a digital image signal associated with a pixel which does not function properly. In general, there are two types of defect correction methods, static correction and dynamic correction. The static correction is a method in which the positions of defects are stored in advance, for example, prior to the shipment of products and information of pixels around a target pixel which is to be subjected to defect correction is interpolated to obtain the information of the target pixel. The dynamic correction is a method of checking the presence of defects during the operation of an imaging apparatus and correcting the detected defect.

Moreover, there is also known an imaging apparatus having a noise reduction processing means. The noise reduction processing means reduces noise such as random noise. When line memories dedicated for the defect correction means and the noise reduction processing means are provided in the imaging apparatus, the circuit size thereof increases. Thus, the imaging apparatus may have a configuration in which the defect correction means and the noise reduction processing means share a line memory, and the results of defect correction are fed back to the noise reduction processing means. In this case, if there is an error in the defect correction by the defect correction means, since the error may affect the noise reduction on pixels other than a pixel in which erroneous defect correction was performed, the image quality may deteriorate. When the defect correction and the noise reduction processing are performed in parallel, there is a problem in that it is difficult to obtain a noise reduction effect with respect to pixels which have been subject to defect correction.

In recent years, as a countermeasure to decrease in the sensitivity due to miniaturization of pixels, many imaging apparatuses use a method of increasing the output gain of an image sensor particularly under a low illuminance condition. In an imaging apparatus, a very small leak current (dark current) generally has nearly no influence on the signal values of pixels. However, when a gain is increased, such a leak current is likely to cause a pixel to output a signal level different from the originally intended level although the difference is not as large as the extent leading to the defect. In this case, when a target pixel is subjected to defect correction, if the signal value of the target pixel is replaced with the signal level of an adjacent pixel, which is different from the originally intended level, a defect correction effect decreases.

DETAILED DESCRIPTION

In general, according to one embodiment, an image processing apparatus includes a defect correction unit, a noise reduction processing unit, and an output selection unit. The defect correction unit performs defect correction on a target pixel. The noise reduction processing unit performs noise reduction processing on the target pixel and a plurality of adjacent pixels. The plurality of adjacent pixels are pixels for the same color as that of the target pixel and are located around the target pixel. The output selection unit selects any one of the outputs from the defect correction unit and from the noise reduction processing unit. The defect correction unit includes a defect determination unit, a contrast determination unit, and an illuminance determination unit. The defect determination unit performs defect determination on the target pixel and the plurality of adjacent pixels. The defect determination unit performs the defect determination based on a difference between the maximum value of the signal values of the plurality of adjacent pixels and the signal value of the target pixel and a difference between the minimum value of the signal values of the plurality of adjacent pixels and the signal value of the target pixel. The contrast determination unit performs contrast determination by comparing a numerical width between the maximum value and the minimum value with a predetermined contrast determination threshold. The illuminance determination unit performs illuminance determination by comparing an illuminance level of a subject and a predetermined illuminance determination threshold. The output selection unit selects the output from the defect correction unit when the target pixel is determined to be a defect. The defect correction unit is made to output a correction value as a signal value which is applied to the target pixel in accordance with the contrast determination and the illuminance determination.

Exemplary embodiments of an image processing apparatus, an image processing method, and a camera module will be explained below in detail with reference to the accompanying drawings. However, the present invention is not limited to the following embodiments.

Figure 1:
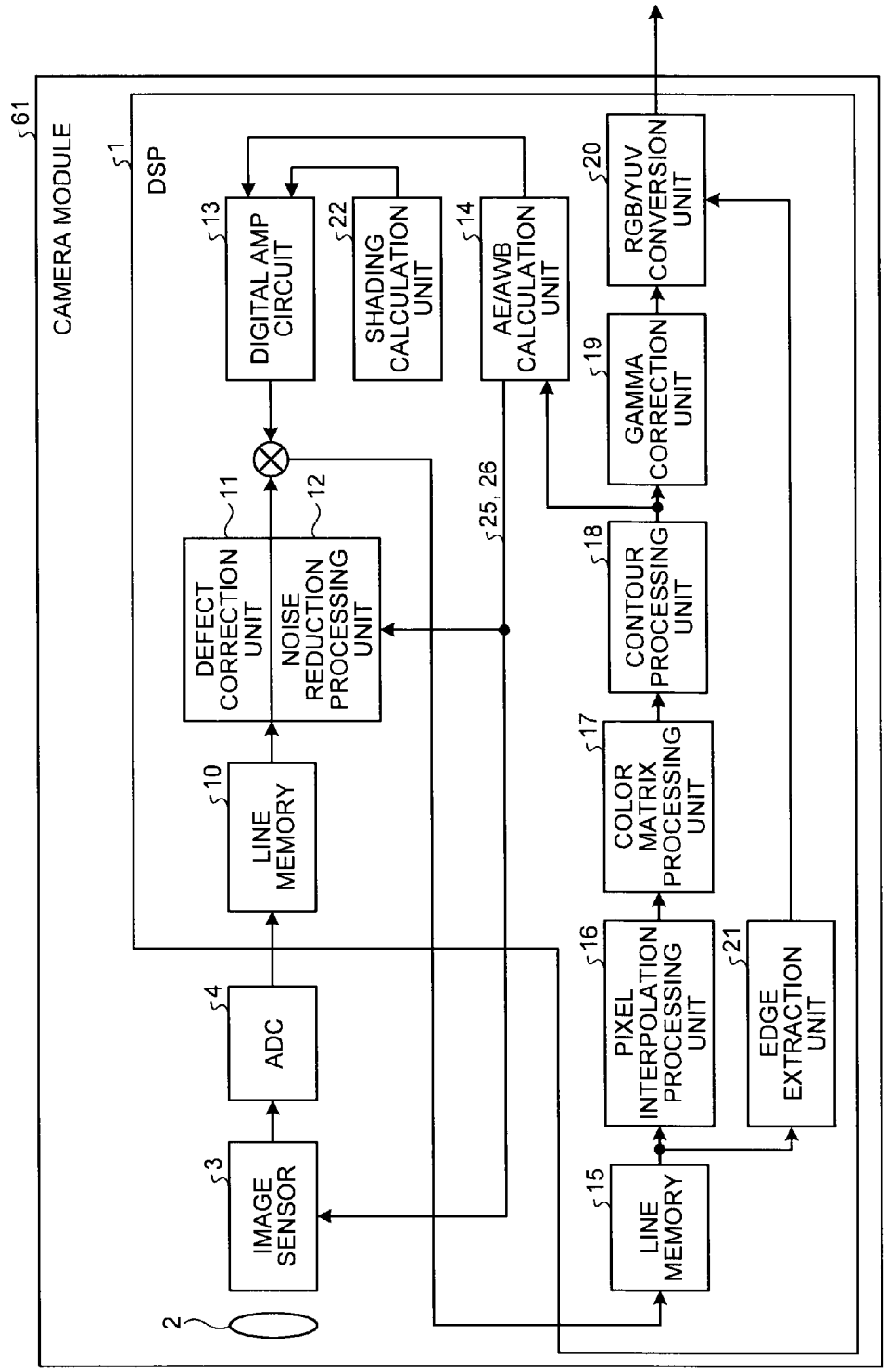
FIG. 1 is a block diagram illustrating a camera module to which an image processing apparatus according to a first embodiment is applied.
Figure 2:
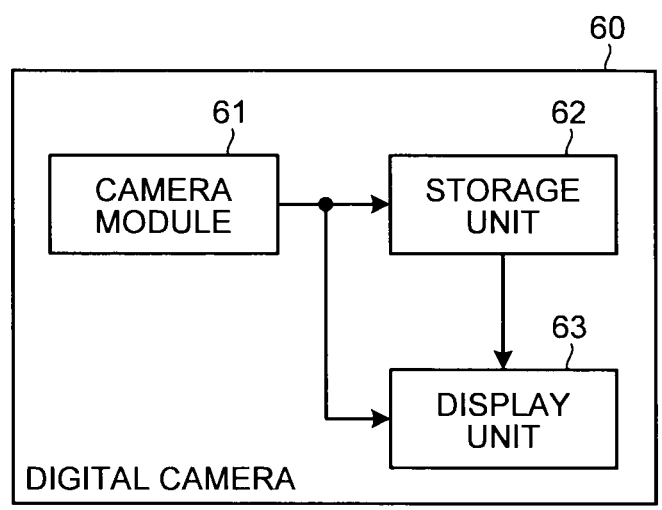
FIG. 2 is a block diagram illustrating the configuration of a digital camera having the camera module shown in FIG. 1.

FIG. 1 is a block diagram of a camera module to which an image processing apparatus according to a first embodiment is applied. FIG. 2 is a block diagram illustrating the configuration of a digital camera having the camera module illustrated in FIG. 1.

A digital camera 60 includes a camera module 61, a storage unit 62, and a display unit 63. The camera module 61 images a subject image. The storage unit 62 stores the images captured by the camera module 61. The display unit 63 displays the images captured by the camera module 61. The display unit 63 is a liquid crystal display, for example.

The camera module 61 outputs image signals to the storage unit 62 and the display unit 63 through imaging of a subject image. The storage unit 62 outputs image signals to the display unit 63 in response to an operation of a user, or the like. The display unit 63 displays images in accordance with the image signals input from the camera module 61 or the storage unit 62.

The camera module 61 includes a lens unit 2, an image sensor 3, an analog-to-digital converter (ADC) 4, and a digital signal processor (DSP) 1.

The lens unit 2 captures light from a subject and forms a subject image on the image sensor 3. The image sensor 3 is a solid-state imaging device that converts the light captured by the lens unit 2 into signal charges to thereby image the subject image.

The image sensor 3 captures the signal values of the colors red (R), green (G), and blue (B) in the order corresponding to the Bayer arrangement to thereby generate analog image signals. The ADC 4 converts the image signals from the image sensor 3, from the analog format to the digital format.

The DSP 1 which is an image processing apparatus performs various kinds of signal processing on the digital image signals from the ADC 4. A line memory 10 provided in the DSP 1 temporarily stores the digital image signals from the ADC 4.

A defect correction unit 11 performs defect correction for correcting a lost portion (defect) of a digital image signal associated with a pixel in the image sensor 3 which does not function properly. The defect correction unit 11 performs defect correction on the digital image signals from the line memory 10. A noise reduction processing unit 12 performs noise reduction processing for reducing noise. The defect correction unit 11 and the noise reduction unit 12 share the line memory 10.

A shading calculation unit 22 calculates a shading correction coefficient for performing shading correction. An AE/AWB calculation unit 14 calculates respective coefficients for performing auto-exposure (AE) adjustment and auto-white balance (AWB) adjustment based on RGB sensitivity signals. The AE/AWB calculation unit 14 outputs an exposure time 25 and an analog gain 26 to the image sensor 3 and a block made up of the defect correction unit 11 and the noise reduction processing unit 12.

A digital amplification (AMP) circuit 13 calculates a digital AMP coefficient based on the coefficients calculated by the AE/AWB calculation unit 14 and the shading correction coefficient calculated by the shading calculation unit 22. Moreover, the digital AMP circuit 13 multiplies a digital AMP coefficient and the digital image signal having passed through the block made up of the defect correction unit 11 and the noise reduction processing unit 12.

The line memory 15 temporarily stores the digital image signal which is multiplied by the digital AMP coefficient. A pixel interpolation unit 16 generates RGB sensitivity signals by performing interpolation (demosaic processing) on the digital image signals which are transferred from the line memory 15 in order of the Bayer arrangement. A color matrix processing unit 17 performs color matrix calculation processing (color-reproduction processing) on the RGB sensitivity signals to obtain color reproduction.

A contour processing unit 18 performs contour enhancement processing using the calculated correction coefficients based on the imaging conditions of the image sensor 3 and the positions of the respective pixels. A gamma correction unit 19 performs gamma correction for correcting the gradation of an image with respect to the RGB sensitivity signals.

A RGB/YUV conversion unit 20 generates a luminance (Y) signal and color difference (UV) signals from the RGB sensitivity signals to thereby convert the format of an image signal from RGB to YUV (for example, YUV422 or the like). An edge extraction unit 21 performs edge detection on the image signals stored in the line memory 15 and outputs the extraction results to the RGB/YUV conversion unit 20. The DSP 1 outputs an image signal which is converted into the YUV format by the RGB/YUV conversion unit 20.

The DSP 1 performs the defect correction by the defect correction unit 11 and the noise reduction processing by the noise reduction processing unit 12 in parallel with respect to the image signals stored in the line memory 10. The DSP 1 includes the line memory 10 which is shared by the defect correction unit 11 and the noise reduction processing unit 12. Thus, it is possible to decrease the circuit size as compared to a case where the line memory is provided for the respective units.

The configuration of the DSP 1 described in the present embodiment is exemplary, other elements other than the elements described in the present embodiment may be added appropriately, and the elements which can be eliminated may be eliminated appropriately.

Figure 3:
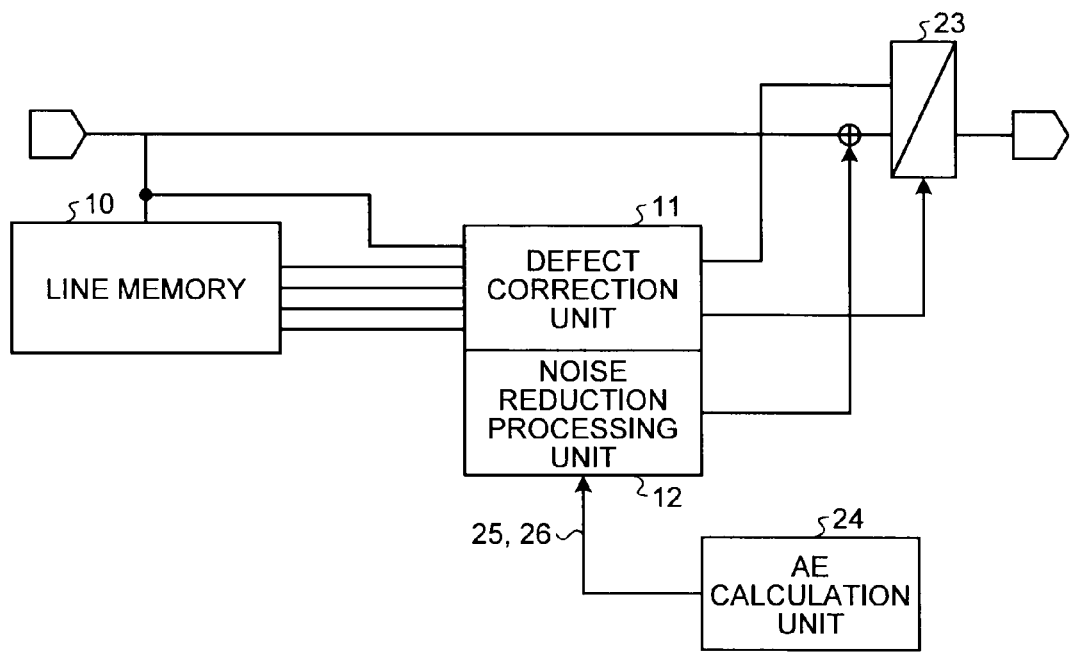
FIG. 3 is a block diagram illustrating a configuration for realizing defect correction and noise reduction processing.

FIG. 3 is a block diagram illustrating the configuration for defect correction and noise reduction processing. The line memory 10 holds four lines of digital image signals therein. The defect correction unit 11 receives five lines of data in total, including the four lines of data held in the line memory 10 and one line of data which is not yet input to the line memory 10.

A selector 23 functions as an output selection unit that selects either the output from the defect correction unit 11 or the output from the noise reduction processing unit 12. An AE calculation unit 24 is included in the AE/AWB calculation unit 18 illustrated in FIG. 1. The AE calculation unit 24 outputs the exposure time 25 and the analog gain 26 to the block made up of the defect correction unit 11 and the noise reduction processing unit 12.

Figure 4:
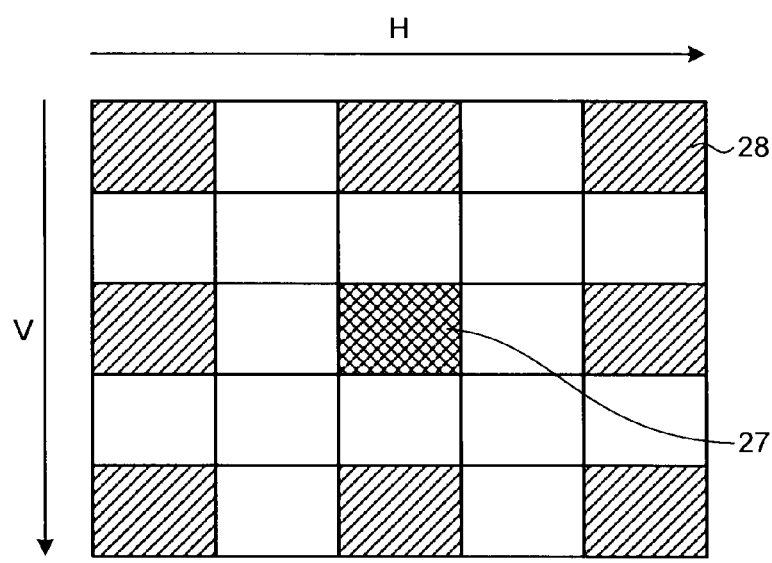
FIG. 4 is a diagram illustrating a target pixel and adjacent pixels.

FIG. 4 is a diagram illustrating a target pixel and adjacent pixels. The respective pixels are assumed to be arranged in two-dimensional directions including the H and V directions which are perpendicular to each other. A target pixel 27 and adjacent pixels 28 are included in a matrix of 5 by 5 pixels among the pixels arranged in the Bayer arrangement in the horizontal (H) and vertical (V) directions.

The target pixel 27 is a pixel located at the center of the matrix. The adjacent pixels 28 are pixels for the same color as that of the target pixel 27 among the pixels included in the matrix. Eight adjacent pixels 28 are present in the matrix. The adjacent pixels 28 are located around the target pixel 27 at a distance of one pixel from the target pixel 27.

Figure 5:
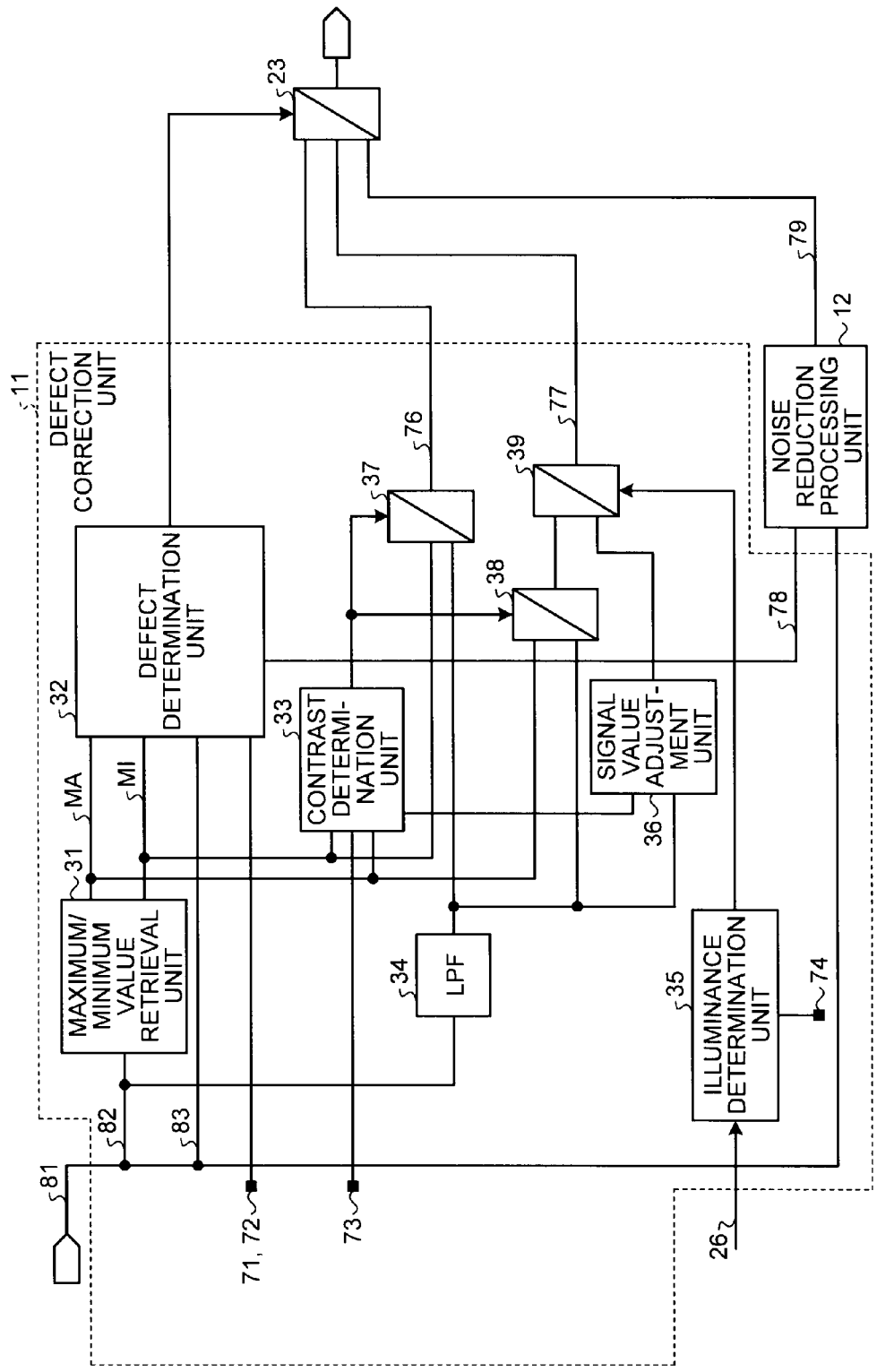
FIG. 5 is a block diagram illustrating the details of a defect correction unit.

FIG. 5 is a block diagram illustrating the details of the defect correction unit. The defect correction unit 11 includes a maximum/minimum value retrieval unit 31, a defect determination unit 32, a contrast determination unit 33, a low-pass filter (LPF) 34, an illuminance determination unit 35, a signal value adjustment unit 36, and selectors 37, 38, and 39.

The defect correction unit 11 receives signal values 81 of nine pixels including the target pixel 27 and the adjacent pixels 28. The maximum/minimum value retrieval unit 31 retrieves the maximum and minimum values MA and MI of the eight signal values 82 of the adjacent pixels 28.

The defect determination unit 32 performs defect determination on the target pixel 27 and the adjacent pixels 28. The defect determination unit 32 performs white defect determination based on the difference between the maximum value MA and the signal value 83 of the target pixel 27 and black defect determination based on the difference between the minimum value MI and the signal value 83 of the target pixel 27. The black defect is a defect in which a low luminance is detected as compared to a case where a pixel functions properly. The white defect is a defect in which a high luminance is detected as compared to a case where a pixel functions properly.

The contrast determination unit 33 determines the contrast of a subject. The LPF 34 functions as an averaging processing unit that performs averaging of a signal value. The illuminance determination unit 35 determines the illuminance level of a subject. The signal value adjustment unit 36 adjusts the signal value which has been subject to the averaging by the LPF 34.

When the target pixel 27 is determined to be a black defect, the selector 37 selects a correction value in accordance with the contrast determination by the contrast determination unit 33. When the target pixel 27 is determined to be a white defect, the selector 38 selects a correction value in accordance with the contrast determination by the contrast determination unit 33. The selectors 37 and 38 function as a first correction selection unit.

When the target pixel 27 is determined to be a white defect, the selector 39 selects a correction value in accordance with the illuminance determination by the illuminance determination unit 35. The selector 39 functions as a second correction selection unit.

The defect correction unit 11 holds a white defect determination threshold 71, a black defect determination threshold 72, a contrast determination threshold 73, and an illuminance determination threshold 74 which are set in advance therein. The white defect determination threshold 71 is a threshold for making white defect determination in the defect determination unit 32. The defect determination unit 32 determines whether the target pixel 27 is a white defect or not, and whether any one of the eight adjacent pixels 28 is a white defect or not, by comparing the difference between the signal value 83 of the target pixel 27 and the maximum value MA with the white defect determination threshold 71.

The black defect determination threshold 72 is a threshold for making black defect determination in the defect determination unit 32. The defect determination unit 32 determines whether the target pixel 27 is a black defect or not, and whether any one of the eight adjacent pixels 28 is a black defect or not, by comparing the difference between the signal value 83 of the target pixel 27 and the minimum value MI with the black defect determination threshold 72.

The contrast determination threshold 73 is a threshold for making contrast determination in the contrast determination unit 33. The contrast determination unit 33 performs the contrast determination by comparing a numerical width between the maximum value MA and the minimum value MI with the contrast determination threshold 73. The white defect determination threshold 71, the black defect determination threshold 72, and the contrast determination threshold 73 may not be fixed but may be variable in conjunction with the analog gain 26 calculated by the AE calculation unit 24.

Figure 6:
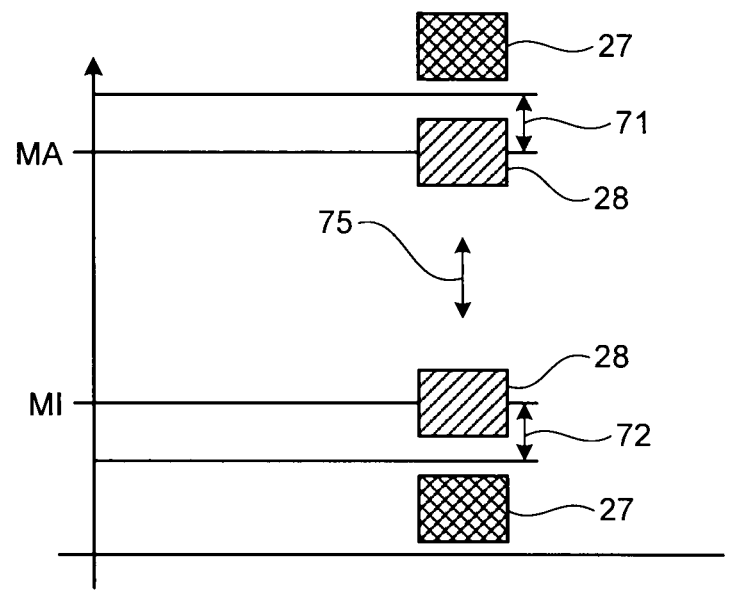
FIG. 6 is a diagram illustrating a case in which a target pixel is determined to be a white defect or a black defect.
Figure 7:
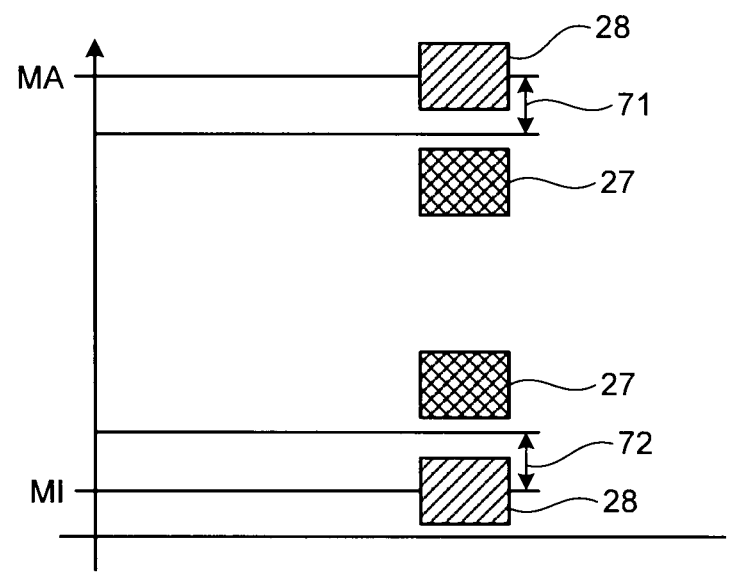
FIG. 7 is a diagram illustrating a case in which one of a plurality of adjacent pixels is determined to be a white defect or a black defect.

FIG. 6 is a diagram illustrating a case in which a target pixel is determined to be a white defect or a black defect. FIG. 7 is a diagram illustrating a case in which one of a plurality of adjacent pixels is determined to be a white defect or a black defect. In FIGS. 6 and 7, the vertical axis represents the level of a signal value. In FIGS. 6 and 7, the central position in the vertical axis direction of the rectangle representing the target pixel 27 indicates the signal value of the target pixel 27. Moreover, the central position in the vertical axis direction of the rectangle representing the adjacent pixel 28 indicates the signal value of the adjacent pixel 28.

FIG. 6 illustrates a case in which a subject is not under a low illuminance condition, and the maximum and minimum values MA and MI are not far from a signal value range 75 of other adjacent pixels 28. In this case, when a calculation result of [(signal value of target pixel 27)−(maximum value MA)] is positive, and the absolute value of the calculation result is greater than the white defect determination threshold 71, the defect determination unit 32 determines that the target pixel 27 is a white defect. Meanwhile, when the calculation result of [(minimum value MI)−(signal value of target pixel 27)] is positive, and the absolute value of the calculation result is greater than the black defect determination threshold 72, the defect determination unit 32 determines that the target pixel 27 is a black defect.

In FIG. 7, when the calculation result of [(signal value of target pixel 27)−(maximum value MA)] is negative, and the absolute value of the calculation result is greater than the white defect determination threshold 71, the defect determination unit 32 determines that a pixel having the maximum value MA among the adjacent pixels 28 is a white defect. Meanwhile, when the calculation result of [(minimum value MI)−(signal value of target pixel 27)] is negative, and the absolute value of the calculation result is greater than the black defect determination threshold 72, the defect determination unit 32 determines that a pixel having the minimum value MI among the adjacent pixels 28 is a black defect.

When the absolute value of the calculation result of [(signal value of target pixel 27)−(maximum value MA)] is not greater than the white defect determination threshold 71, and the absolute value of the calculation result of [(minimum value MI)−(signal value of target pixel 27)] is not greater than the black defect determination threshold 72, the defect determination unit 32 determines that none of the target pixel 27 and the adjacent pixels 28 is a defect. The relation between the defect determination and the positive/negative of the calculation result is appropriately set in accordance with the subtracting order.

The contrast determination unit 33 determines that the contrast is high when the numerical width between the maximum value MA and the minimum value MI is greater than the contrast determination threshold 73. The contrast determination unit 33 determines that the contrast is low when the numerical width is not greater than the contrast determination threshold 73.

The LPF 34 performs averaging processing on the signal values of the adjacent pixels 28. When the contrast determination unit 33 determines that the contrast is low, the selector 37 selects averaged data (first correction value) output from the LPF 34 as a correction value 76 for correcting a black defect. Moreover, the selector 38 selects the averaged data (first correction value) output from the LPF 34 as a correction value 77 for correcting a white defect.

When the contrast of a scene is low, the defect correction unit 11 selects the averaged data of the plurality of adjacent pixels 28 as the correction values 76 and 77, thus emphasizing a noise reduction effect.

When the contrast determination unit 33 determines that the contrast is high, the selector 37 selects the minimum value MI (second correction value) as the correction value 76 for correcting a black defect. Moreover, the selector 38 selects the maximum value MA (second correction value) as the correction value 77 for correcting a white defect.

The second correction value corresponds to a value which is closest to the signal value of the target pixel 27 among the signal values of the adjacent pixels 28. When the contrast of a scene is high, the defect correction unit 11 selects a value which is closest to the signal value of the target pixel 27 among the signal values of the plurality of adjacent pixels 28 as the correction values 76 and 77, thus emphasizing the effect of suppressing damage to an image as much as possible when in appropriate defect correction was performed.

The signal value adjustment unit 36 adjusts the averaged data output from the LPF 34 in accordance with the numerical width (contrast) between the maximum value MA and the minimum value MI. The signal value adjustment unit 36 subtracts [(maximum value MA)−(minimum value MI)]/8 from the averaged data output from the LPF 34, for example. In this way, the defect correction unit 11 adjusts an error in the averaged data due to the effect of a leak current. The adjustment by the signal value adjustment unit 36 may be performed by any method as long as the averaged data is adjusted in accordance with the contrast, and may be changed appropriately.

Figure 8:
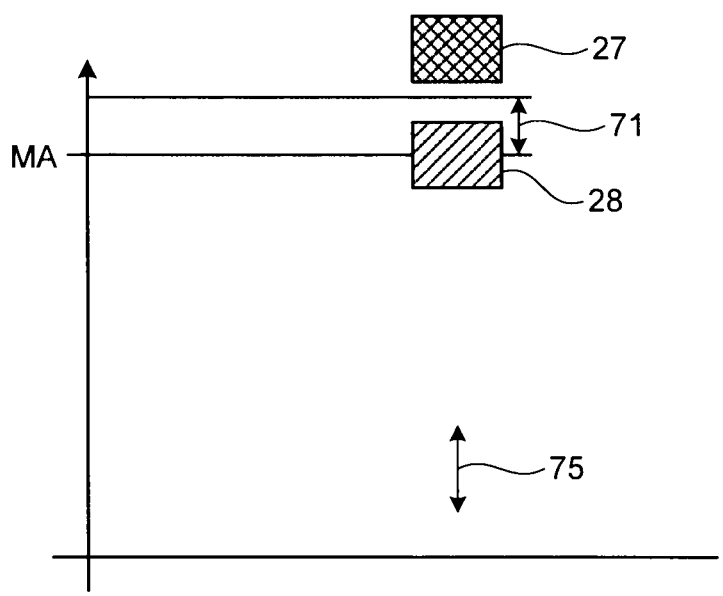
FIG. 8 is a diagram illustrating a case in which a correction value adjusted by a signal value adjustment unit is selected.

FIG. 8 is a diagram illustrating a case in which a correction value adjusted by a signal value adjustment unit is selected. When a subject is under a low illuminance condition and the target pixel 27 is a white defect, the maximum value MA is far greatly from the signal value range 75 of the other adjacent pixels 28 and is close to the high level side. In this case, if the signal value of the target pixel 27 is replaced with the maximum value MA, the defect correction creates two pixels having a gradation close to a white defect.

The illuminance determination unit 35 determines the level of the illuminance of a subject by comparing the analog gain 26 which is the calculation result of the AE calculation unit 24 with the illuminance determination threshold 74. When the illuminance determination unit 35 determines that the subject is under a low illuminance condition, the selector 39 selects the signal value (third correction value) which has been adjusted by the signal value adjustment unit 36 as the correction value 77 for correcting a white defect. Moreover, when the illuminance determination unit 35 determines that the subject is not under a low illuminance condition, the selector 39 selects the output (first or second correction value) from the selector 38 as the correction value 77 for correcting a white defect.

Even when the contrast increases due to the increase in the analog gain 26, the defect correction unit 11 can suppress the decrease in the defect correction effect, which occurs when the signal value of the target pixel 27 is replaced with the signal value which is close to the white defect among the signal values of the plurality of adjacent pixels 28, through the adjustment by the signal value adjustment unit 36. Moreover, the defect correction unit 11 can maintain the effect of the averaging processing by the LPF 34 as compared to the case of just increasing the contrast determination threshold 73.

The noise reduction processing unit 12 performs noise reduction processing on the target pixel 27 and the adjacent pixels 28. The defect determination unit 32 outputs information 78 on the adjacent pixel 28 which is determined to be a white defect or a black defect to the noise reduction processing unit 12. The noise reduction processing unit 12 performs the noise reduction processing by replacing the signal value of the adjacent pixel 28 which is determined to be a white defect or a black defect with the signal value of the target pixel 27. In this way, the noise reduction processing unit 12 can perform the noise reduction processing while eliminating the influence from defects.

When the defect determination unit 32 determines that the target pixel 27 is a black defect, the selector 23 selects the correction value 76 output from the selector 37. When the defect determination unit 32 determines that the target pixel 27 is a white defect, the selector 23 selects the correction value 77 output from the selector 39. In addition, when the defect determination unit 32 determines that the target pixel 27 does not correspond to any one of a black defect and a white defect, the selector 23 selects the signal value 79 output from the noise reduction processing unit 12.

In this way, the DSP 1 allows the saving of the line memory 10, suppression of influence from defects, and noise reduction by sharing the line memory 10 with the defect correction unit 11 and the noise reduction processing unit 12 and performing switching appropriately between the defect correction processing and the noise reduction processing. Moreover, since the DSP 1 adjusts the correction value for correcting a white defect when the illuminance level is low, it is possible to suppress the effect of a leak current during the defect correction. In this way, the camera module 61 can decrease the circuit size of the DSP 1 and thus obtain a high-quality image through the defect correction and noise reduction processing.

The noise reduction processing unit 12 is not limited to the configuration which performs the noise reduction processing by replacing the signal value of the adjacent pixel 28 which is determined to be a defect with the signal value of the target pixel 27. The noise reduction processing unit 12 may perform the noise reduction processing by eliminating the adjacent pixel 28 which is determined to be a defect, for example. In this case, it is also possible to suppress the influence of defects on the noise reduction processing.

Figure 9:
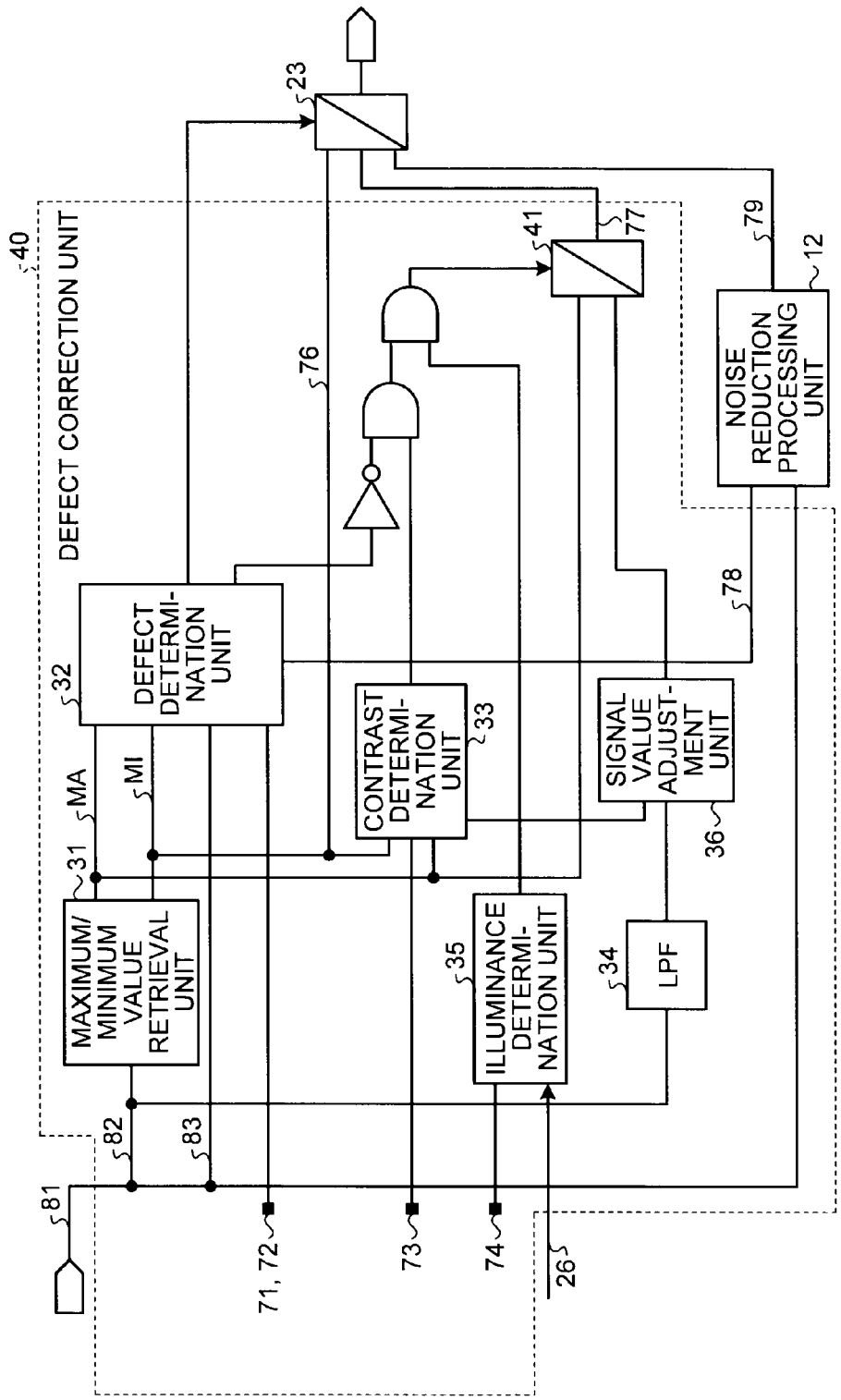
FIG. 9 is a block diagram illustrating the configuration of an image processing apparatus according to a second embodiment, for realizing defect correction and noise reduction processing.

FIG. 9 is a block diagram illustrating the configuration of an image processing apparatus according to a second embodiment, for realizing defect correction and noise reduction processing. The same portions as the first embodiment will be denoted by the same reference numerals, and redundant description thereof will not be given.

A defect correction unit 40 includes a maximum/minimum value retrieval unit 31, a defect determination unit 32, a contrast determination unit 33, a low-pass filter (LPF) 34, an illuminance determination unit 35, a signal value adjustment unit 36, and a selector 41.

Similarly to the first embodiment, the signal value adjustment unit 36 adjusts the averaged data output from the LPF 34 in accordance with the numerical width (contrast) between a maximum value MA and a minimum value MI. The signal value adjustment unit 36 subtracts [(maximum value MA)−(minimum value MI)]/8 from the averaged data output from the LPF 34, for example.

The selector 41 selects a correction value in accordance with the defect determination by the defect determination unit 32, the contrast determination by the contrast determination unit 33, and the illuminance determination by the illuminance determination unit 35. The selector 41 functions as a correction selection unit that selects any one of a signal value (second correction value) which is closest to the signal value of a target pixel 27 among the signal values of a plurality of adjacent pixels 28 and a signal value (third correction value) which has been adjusted by the signal value adjustment unit 36.

Figure 10:
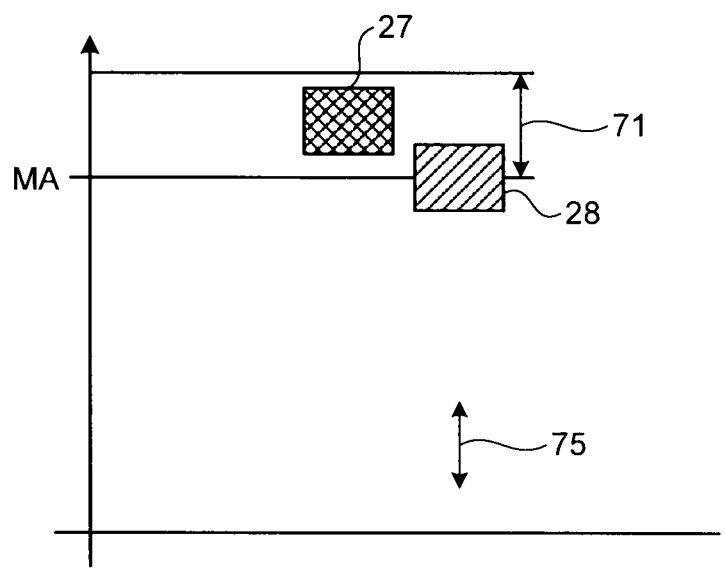
FIG. 10 is a diagram illustrating a case in which a correction value adjusted by a signal value adjustment unit is selected.

FIG. 10 is a diagram illustrating a case in which a correction value adjusted by a signal value adjustment unit is selected. When a subject is under a low illuminance condition and one of the target pixel 27 and the adjacent pixels 28 is a white defect, the maximum value MA which is the signal value of one of the adjacent pixels 28 is far from a signal value range 75 of other adjacent pixels 28 and is on the high level side of the signal value range 75.

In this case, since the difference between the signal value of the target pixel 27 and the maximum value MA is smaller than a white defect determination threshold 71, the defect determination unit 32 determines that the target pixel 27 is not a white defect. When the maximum value MA is greatly far from the signal value range 75 and the numerical width between the maximum value MA and the minimum value MI is greater than a contrast determination threshold 73, the contrast determination unit 33 determines that the contrast is high. In this case, if the signal value of the target pixel 27 is replaced with the maximum value MA, two white defects are created.

When it is determined that the target pixel 27 is not a white defect, the contrast is high, and the illuminance level is low; the selector 41 selects a signal value (third correction value) which has been adjusted by the signal value adjustment unit 36 as a correction value 77. In this case, the selector 23 selects the correction value 77.

When an affirmative result is obtained in at least one of the determination whether the target pixel 27 is a white defect, the determination whether the contrast is low, and the determination whether the illuminance level is not low, the selector 41 selects the maximum value MA (second correction value) as the correction value 77. The selector 23 selects the correction value 77 when the target pixel 27 is determined to be a white defect.

In the present embodiment, similarly to the first embodiment, the image processing apparatus can decrease the number of line memories, suppress the influence of defects, and reduce noise. Moreover, the image processing apparatus can correct a white defect occurring in two pixels under a low illuminance condition.

In addition, in the defect correction unit 40, even when the target pixel 27 is not a white defect but one of the adjacent pixels 28 is a white defect, there may be a case in which the defect determination unit 32 fails to detect a white defect, and the contrast determination unit 33 determines that the contrast is high. In this case, the image processing apparatus can suppress the influence of white defects through the noise reduction processing in the noise reduction processing unit 12 similarly to the first embodiment.

Figure 11:
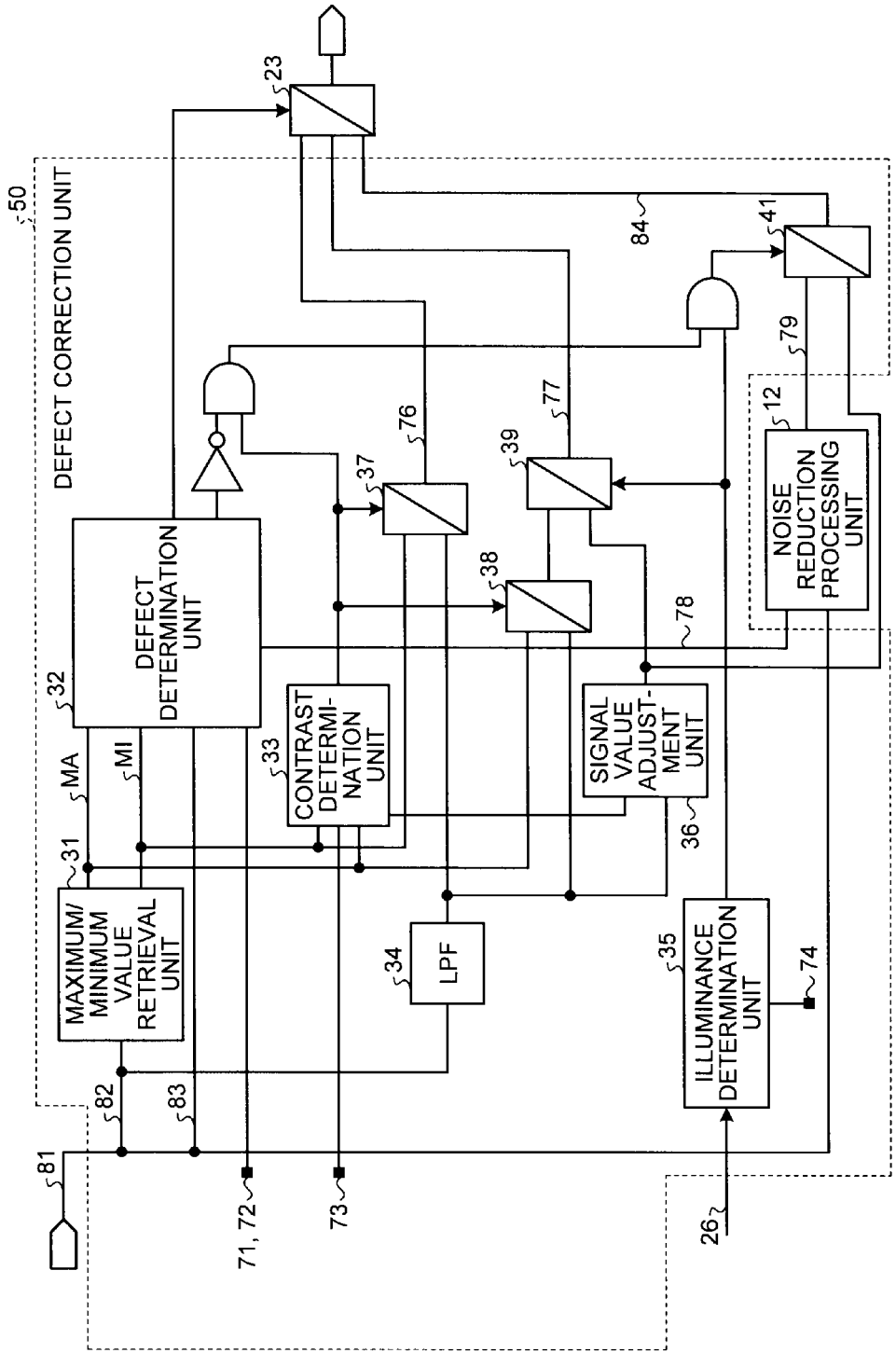
FIG. 11 is a block diagram illustrating the configuration of an image processing apparatus according to a third embodiment, for realizing defect correction and noise reduction processing.

FIG. 11 is a block diagram illustrating the configuration of an image processing apparatus according to a third embodiment, for realizing defect correction and noise reduction processing. A defect correction unit 50 of the present embodiment includes the constituent elements of the defect correction unit 11 of the first embodiment and the constituent elements of the defect correction unit 40 of the second embodiment.

The defect correction unit 50 includes a maximum/minimum value retrieval unit 31, a defect determination unit 32, a contrast determination unit 33, a low-pass filter (LPF) 34, an illuminance determination unit 35, a signal value adjustment unit 36, and selectors 37, 38, 39, and 41.

The selector 41 selects a correction value 84 in accordance with the defect determination by the defect determination unit 32, the contrast determination by the contrast determination unit 33, and the illuminance determination by the illuminance determination unit 35. Specifically, the selector 41 selects any one of a signal value (third correction value) which has been adjusted by the signal value adjustment unit 36 and a signal value 79 output from a noise reduction processing unit 12 as the correction value 84. The selector 41 functions as a third correction selection unit.

When it is determined that the target pixel 27 is not a white defect, the contrast is high, and the illuminance level is low, the selector 41 selects the signal value (third correction value) which has been adjusted by the signal value adjustment unit 36 as the correction value 84. In this case, the selector 23 selects the correction value 84.

When an affirmative result is obtained in at least one of the determination whether the target pixel 27 is a white defect, the determination whether the contrast is low, and the determination whether the illuminance level is not low, the selector 41 selects the signal value 79 output from the noise reduction processing unit 12 as the correction value 84. The selector 23 selects the correction value 84 when the defect determination unit 32 determines that the target pixel 27 does not correspond to any one of a black defect and a white defect.

In the present embodiment, similarly to the first embodiment, the image processing apparatus can decrease the number of line memories, suppress the influence of defects, and reduce noise. Moreover, the image processing apparatus can correct a white defect occurring in two pixels similarly to the second embodiment.

The image processing apparatus according to the first, second, and third embodiments may be applied to electronic apparatuses other than the digital camera, such as, for example, a camera-attached mobile phone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a defect correction unit that performs defect correction on a target pixel;
   a noise reduction processing unit that performs noise reduction processing on the target pixel and a plurality of adjacent pixels which are pixels for the same color as that of the target pixel and are located around the target pixel; and
   an output selection unit that selects any one of the output from the defect correction unit and the output from the noise reduction processing unit,
   wherein the defect correction unit includes
   a defect determination unit that performs defect determination on the target pixel and the plurality of adjacent pixels based on a difference between a maximum value of signal values of the plurality of adjacent pixels and a signal value of the target pixel and based on a difference between a minimum value of the signal values of the plurality of adjacent pixels and the signal value of the target pixel, a contrast determination unit that performs contrast determination by comparing a numerical width between the maximum value and the minimum value with a predetermined contrast determination threshold, and an illuminance determination unit that performs illuminance determination by comparing an illuminance level of a subject with a predetermined illuminance determination threshold, wherein the output selection unit selects the output from the defect correction unit when the target pixel is determined to be a defect, and wherein the defect correction unit enables a correction value to be output as a signal value applied to the target pixel in accordance with the contrast determination and the illuminance determination.

2. The image processing apparatus according to claim 1, wherein the defect correction unit further includes an averaging processing unit that averages the signal values of the plurality of adjacent pixels, a signal value adjustment unit that adjusts the averaged signal value in accordance with the numerical width, a first correction selection unit that selects any one of a first correction value which is the averaged signal value and a second correction value which is a signal value that is closest to the signal value of the target pixel among the signal values of the plurality of adjacent pixels in accordance with the contrast determination, and a second correction selection unit that selects any one of the first correction value or the second correction value selected by the first correction selection unit and a third correction value which is a signal value adjusted by the signal value adjustment unit in accordance with the illuminance determination.

3. The image processing apparatus according to claim 2, wherein the second correction selection unit selects the third correction value when the illuminance level of the subject is determined to be smaller than the illuminance determination threshold.

4. The image processing apparatus according to claim 2, wherein the first correction selection unit selects the first correction value when the numerical width is determined to be smaller than the contrast determination threshold and selects the second correction value when the numerical width is determined to be greater than the contrast determination threshold.

5. The image processing apparatus according to claim 2, wherein the defect correction unit further includes a third correction selection unit that selects any one of the output from the noise reduction processing unit and the third correction value in accordance with the defect determination, the contrast determination, and the illuminance determination, and wherein when the target pixel is not determined to be a white defect, the numerical width is determined to be greater than the contrast determination threshold, and the illuminance level of the subject is determined to be smaller than the illuminance determination threshold; the third correction selection unit and the output selection unit select the third correction value.

6. The image processing apparatus according to claim 1, wherein the defect correction unit further includes an averaging processing unit that averages the signal values of the plurality of adjacent pixels, a signal value adjustment unit that adjusts the averaged signal value in accordance with the numerical width, and a correction selection unit that selects any one of a signal value that is closest to the signal value of the target pixel among the signal values of the plurality of adjacent pixels, and the signal value adjusted by the signal value adjustment unit in accordance with the defect determination, the contrast determination, and the illuminance determination.

7. The image processing apparatus according to claim 6, wherein when the target pixel is not determined to be a white defect, the numerical width is determined to be greater than the contrast determination threshold, and the illuminance level of the subject is determined to be smaller than the illuminance determination threshold; the correction selection unit selects the signal value adjusted by the signal value adjustment unit.

8. The image processing apparatus according to claim 1, wherein the noise reduction processing unit performs the noise reduction processing by replacing the signal value of an adjacent pixel with the signal value of the target pixel, which is determined to be a defect, when any one of the plurality of adjacent pixels is determined to be a defect.

9. An image processing method comprising:

performing defect correction on a target pixel;

performing noise reduction processing on the target pixel and a plurality of adjacent pixels which are pixels for the same color as that of the target pixel and are located around the target pixel; and selecting any one of the output through the defect correction and the output through the noise reduction processing, wherein the defect correction involves performing defect determination on the target pixel and the plurality of adjacent pixels based on a difference between a maximum value of signal values of the plurality of adjacent pixels and a signal value of the target pixel and based on a difference between a minimum value out of the signal values of the plurality of adjacent pixels and the signal value of the target pixel, performing contrast determination by comparing a numerical width between the maximum value and the minimum value with a predetermined contrast determination threshold, and performing illuminance determination by comparing an illuminance level of a subject with a predetermined illuminance determination threshold, wherein in the selecting any one of the outputs, the output through the defect correction is selected when the target pixel is determined to be a defect, and wherein in the performing the defect correction, a correction value is enabled to be output as a signal value which is applied to the target pixel in accordance with the contrast determination and the illuminance determination.

10. The image processing method according to claim 9, wherein the defect correction involves averaging the signal values of the plurality of adjacent pixels;

adjusting the averaged signal values in accordance with the numerical width;

performing first correction selection of selecting any one between a first correction value which is the averaged signal value and a second correction value which is a signal value that is closest to the signal value of the target pixel among the signal values of the plurality of adjacent pixels in accordance with the contrast determination, and performing second correction selection of selecting any one between the first correction value or the second correction value selected by the first correction selection and a third correction value which is a signal value adjusted by the signal value adjustment in accordance with the illuminance determination.

11. The image processing method according to claim 10, wherein in the performing the second correction selection, the third correction value is selected when the illuminance level of the subject is determined to be smaller than the illuminance determination threshold.

12. The image processing method according to claim 10, wherein in the performing the first correction selection, the first correction value is selected when the numerical width is determined to be smaller than the contrast determination threshold, and the second correction value is selected when the numerical width is determined to be greater than the contrast determination threshold.

13. The image processing method according to claim 10, wherein the defect correction further involves performing third correction selection of selecting any one between the output through the noise reduction processing and the third correction value in accordance with the defect determination, the contrast determination, and the illuminance determination, and wherein when the target pixel is not determined to be a white defect, the numerical width is determined to be greater than the contrast determination threshold, and the illuminance level of the subject is determined to be smaller than the illuminance determination threshold; the third correction value is selected in the performing the third correction selection and in the selecting any one of the outputs.

14. The image processing method according to claim 9, wherein the defect correction further involves averaging the signal values of the plurality of adjacent pixels, performing signal value adjustment of adjusting the averaged signal value in accordance with the numerical width, and performing correction selection of selecting any one between a signal value that is closest to the signal value of the target pixel among the signal values of the plurality of adjacent pixels and the signal value adjusted by the signal value adjustment in accordance with the defect determination, the contrast determination, and the illuminance determination.

15. The image processing method according to claim 14, wherein when the target pixel is not determined to be a white defect, the numerical width is determined to be greater than the contrast determination threshold, and the illuminance level of the subject is determined to be smaller than the illuminance determination threshold; the signal value adjusted by the signal value adjustment is selected in the performing the correction selection.

16. The image processing method according to claim 9, wherein the noise reduction processing involves replacing the signal value of an adjacent pixel with the signal value of the target pixel, which is determined to be a defect, when any one of the plurality of adjacent pixels is determined to be a defect.

17. A camera module comprising:
a lens unit that captures light from a subject;
an image sensor that generates an image signal corresponding to the light captured by the lens unit; and
an image processing apparatus that performs image processing on the image signal from the image sensor,
wherein the image processing apparatus includes
a defect correction unit that performs defect correction on a target pixel;
a noise reduction processing unit that performs noise reduction processing on the target pixel and a plurality of adjacent pixels which are pixels for the same color as that of the target pixel and are located around the target pixel; and
an output selection unit that selects any one of the output from the defect correction unit and the output from the noise reduction processing unit,
wherein the defect correction unit includes
a defect determination unit that performs defect determination on the target pixel and the plurality of adjacent pixels based on a difference between a maximum value of signal values of the plurality of adjacent pixels and a signal value of the target pixel and based on a difference between a minimum value of the signal values of the plurality of adjacent pixels and the signal value of the target pixel,
a contrast determination unit that performs contrast determination by comparing a numerical width between the maximum value and the minimum value with a predetermined contrast determination threshold, and
an illuminance determination unit that performs illuminance determination by comparing an illuminance level of a subject with a predetermined illuminance determination threshold,
wherein the output selection unit selects the output from the defect correction unit when the target pixel is determined to be a defect, and
wherein the defect correction unit enables a correction value to be output as a signal value which is applied to the target pixel in accordance with the contrast determination and the illuminance determination.

18. The camera module according to claim 17, wherein the defect correction unit includes
an averaging processing unit that averages the signal values of the plurality of adjacent pixels,
a signal value adjustment unit that adjusts the averaged signal value in accordance with the numerical width,
a first correction selection unit that selects any one of a first correction value which is the averaged signal value and a second correction value which is a signal value that is closest to the signal value of the target pixel among the signal values of the plurality of adjacent pixels in accordance with the contrast determination, and
a second correction selection unit that selects any one of the first correction value or the second correction value selected by the first correction selection unit and a third correction value which is a signal value adjusted by the signal value adjustment unit in accordance with the illuminance determination.

19. The camera module according to claim 18, wherein the second correction selection unit selects the third correction value when the illuminance level of the subject is determined to be smaller than the illuminance determination threshold.

20. The camera module according to claim 17, wherein the defect correction unit further includes
an averaging processing unit that averages the signal values of the plurality of adjacent pixels, a signal value adjustment unit that adjusts the averaged signal value in accordance with the numerical width, and a correction selection unit that selects any one of a signal value that is closest to the signal value of the target pixel among the signal values of the plurality of adjacent pixels and the signal value adjusted by the signal value adjustment unit in accordance with the defect determination, the contrast determination, and the illuminance determination.

* * * * *